United States Patent
Kahn

(10) Patent No.: US 12,159,981 B2
(45) Date of Patent: *Dec. 3, 2024

(54) APPARATUS AND METHOD FOR DETECTION OF DEFORMATION IN BATTERY CELLS

(71) Applicant: Tesla, Inc., Austin, TX (US)

(72) Inventor: Michael Kahn, San Mateo, CA (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,092

(22) Filed: Dec. 2, 2022

(65) Prior Publication Data

US 2023/0102109 A1 Mar. 30, 2023

Related U.S. Application Data

(63) Continuation of application No. 16/285,294, filed on Feb. 26, 2019, now Pat. No. 11,522,232.

(Continued)

(51) Int. Cl.
| | |
|---|---|
| *G01B 5/30* | (2006.01) |
| *G01B 3/18* | (2006.01) |
| *G01B 11/10* | (2006.01) |
| *G01B 21/10* | (2006.01) |
| *G01B 21/32* | (2006.01) |
| *H01M 10/42* | (2006.01) |
| *H01M 10/48* | (2006.01) |

(52) U.S. Cl.
CPC .......... *H01M 10/4285* (2013.01); *G01B 3/18* (2013.01); *G01B 5/30* (2013.01); *G01B 11/10* (2013.01); *G01B 21/10* (2013.01); *G01B 21/32* (2013.01); *H01M 10/48* (2013.01)

(58) Field of Classification Search
None
See application file for complete search history.

(56) References Cited

U.S. PATENT DOCUMENTS 3,963,397 A 6/1976 Cruzen et al.
4,170,067 A 10/1979 McIver et al.
(Continued)

FOREIGN PATENT DOCUMENTS

JP 2023503082 A * 1/2023

*Primary Examiner* — Yaritza Guadalupe-McCall
(74) *Attorney, Agent, or Firm* — Knobbe, Martens, Olson & Bear, LLP

(57) ABSTRACT

A deformation detection apparatus includes a cell movement-control assembly to handle a linear motion and a rotational motion of a battery cell, a body that supports the cell movement-control assembly, a digital micrometer, and control circuitry. The control circuitry controls a displacement of the battery cell between a first position and a second position along a longitudinal axis through a scanning region of the digital micrometer and a plurality of rotational positions of the battery cell at a plurality of charge states and a plurality of discharge states. The control circuitry measures a plurality of outer diameter values of the battery cell for a plurality of linear positions and a plurality of rotational positions along the longitudinal axis of the battery cell and determines a change in a geometrical shape (deformation and/or strain) of the battery cell for the plurality of linear positions and the plurality of rotational positions.

18 Claims, 8 Drawing Sheets

Related U.S. Application Data

(60) Provisional application No. 62/635,252, filed on Feb. 26, 2018.

(56) References Cited

U.S. PATENT DOCUMENTS

| | | | |
|---|---|---|---|
| 5,287,631 A | 2/1994 | Stade | |
| 6,829,839 B2 | 12/2004 | Killough | |
| 7,765,712 B2 | 8/2010 | Stockman | |
| 7,802,374 B1 | 9/2010 | Chen et al. | |
| 10,184,778 B2 | 1/2019 | Yoon et al. | |
| 10,481,215 B2 | 11/2019 | Cai et al. | |
| 11,522,232 B2 * | 12/2022 | Kahn | H01M 10/4285 |
| 2015/0340744 A1 | 11/2015 | Knobloch et al. | |
| 2016/0380317 A1 | 12/2016 | Lin et al. | |
| 2023/0102109 A1 * | 3/2023 | Kahn | G01B 21/32 |
| | | | 33/501.03 |
| 2023/0296676 A1 * | 9/2023 | Brecht | H01M 10/4285 |
| | | | 429/90 |

\* cited by examiner

APPARATUS AND METHOD FOR DETECTION OF DEFORMATION IN BATTERY CELLS

INCORPORATION BY REFERENCE TO ANY PRIORITY APPLICATIONS

The present U.S. Utility Patent Application is a continuation of, and claims priority to U.S. patent application Ser. No. 16/285,294, which was filed on Feb. 26, 2019 and titled "APPARATUS AND METHOD FOR DETECTION OF DEFORMATION IN BATTERY CELLS and which is now U.S. Pat. No. 11,522,232. U.S. patent application Ser. No. 16/285,294 claims priority pursuant to 35 U.S.C. § 119(e) to U.S. Provisional Application No. 62/635,252, entitled "APPARATUS AND METHOD FOR DETECTION OF DEFORMATION IN BATTERY CELLS", filed Feb. 26, 2018. The above-recited applications are hereby incorporated herein by reference in their entirety and made part of the present U.S. Utility Patent Application for all purposes.

BACKGROUND OF THE INVENTION

Field of the Invention

The disclosure relates to deformation strain measurement technologies for battery cells. More specifically, various embodiments of the disclosure relate to an apparatus and method for accurate detection and measurement of deformation in battery cells.

Description of the Related Art

Battery cycle life is a crucial parameter for optimal performance and operation of battery dependent loads. Development of rechargeable battery cells that offer significant battery cycle life and thereby operate under different operational environments, current and voltage ranges, and under action of different physical forces, is still an active area of research. In certain scenarios, a battery cell may operate in an operational environment where ambient temperature may intermittently surge to levels above the stable thermal temperature that is defined for normal operation of the battery cell. In certain other scenarios, the battery cell may be further subjected to high charge/discharge rates (C-rate), large periodic loads, and may operate under different charge states. In such scenarios, the interior of the battery cells may encounter significant heating, frequent intercalation/deintercalation and/or alloying/dealloying of lithium ions from the electrodes of the battery cell, and/or lithium plating on electrode or current collector surfaces. These effects cause dynamic expansion of different materials, such as thickening of electrodes or volume expansion of electrochemically active materials within the battery cell, and may therefore be observed at the exterior surface of the battery cell. As a battery cell includes different layers of electrochemically active material that are structurally sandwiched over each other, as well as conductive tabs, the swelling/deformation of a battery cell (or cell casing) may be asymmetric and localized at different regions/spots on the battery cell. This may cause reversible or sometimes irreversible mechanical strain and irreversible mechanical degradation of the electrode material, which may not be desirable.

Traditionally, the deformation in the battery cells are measured by using strain gages, or optical gauges that only provide the deformation at one specific point of the battery cell. The deformation at one specific point of the battery cell may not provide correct status of deformation across the entire surface of the battery cell, resulting in poor strain and deformation measurements. Further, the deformations at a certain point in time only accounts for a specific charge state of the battery cell and deformations at other charge states may not be adequately captured using traditional methods.

Further limitations and disadvantages of conventional and traditional approaches will become apparent to one of skill in the art, through comparison of described systems with some aspects of the present disclosure, as set forth in the remainder of the present application and with reference to the drawings.

SUMMARY OF THE INVENTION

An apparatus and method for detection of deformation in battery cells at different charge and discharge states is substantially shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION OF THE PREFERRED EMBODIMENT

The following described implementations may be found in the disclosed method and apparatus for detection of deformation in battery cells. The disclosed deformation detection apparatus enables contactless detection of deformations/swelling of the battery cell across the entire surface of the battery cell. The deformation detection apparatus may be used to operate the battery cell under different simulated operational conditions, such as at different operational temperatures, different charge states, different charge rates (C-rate), etc. Under such simulated operational conditions, outer diameter values of the battery cell may be continuously determined based on continuous scans performed using a digital micrometer (for example, an optical micrometer) as the battery cell is moved linearly and/or rotated along the longitudinal axis of the battery cell. The disclosed apparatus provides high precision optical outer diameter (OD) measurements of a cylindrical secondary battery (e.g. a rechargeable lithium-ion battery cell) throughout the length of the cell, at every rotational position (theta position), and at every charge state of the battery cell. With the precise measurement of outer diameter values at all positions of the battery cell and at every charge state, it is possible to accurately measure strain (i.e., swelling or deformation) of the cylindrical battery cell during each charge or discharge state and during other physical diameter changes, such as thermal expansion. Conventional methods for measuring strain, such as a traditional strain gage, may not provide correct deformation measurements for a battery cell as the 3D geometry of the battery cell is not captured at different points in time across the length of the battery and at different rotation state of the battery cell. The disclosure method and apparatus further provides a true four dimensional (4D) representation of a battery cell that may undergo diameter changes (i.e. deformation) at different charge and discharge states at different points in time.

Figure 1A:
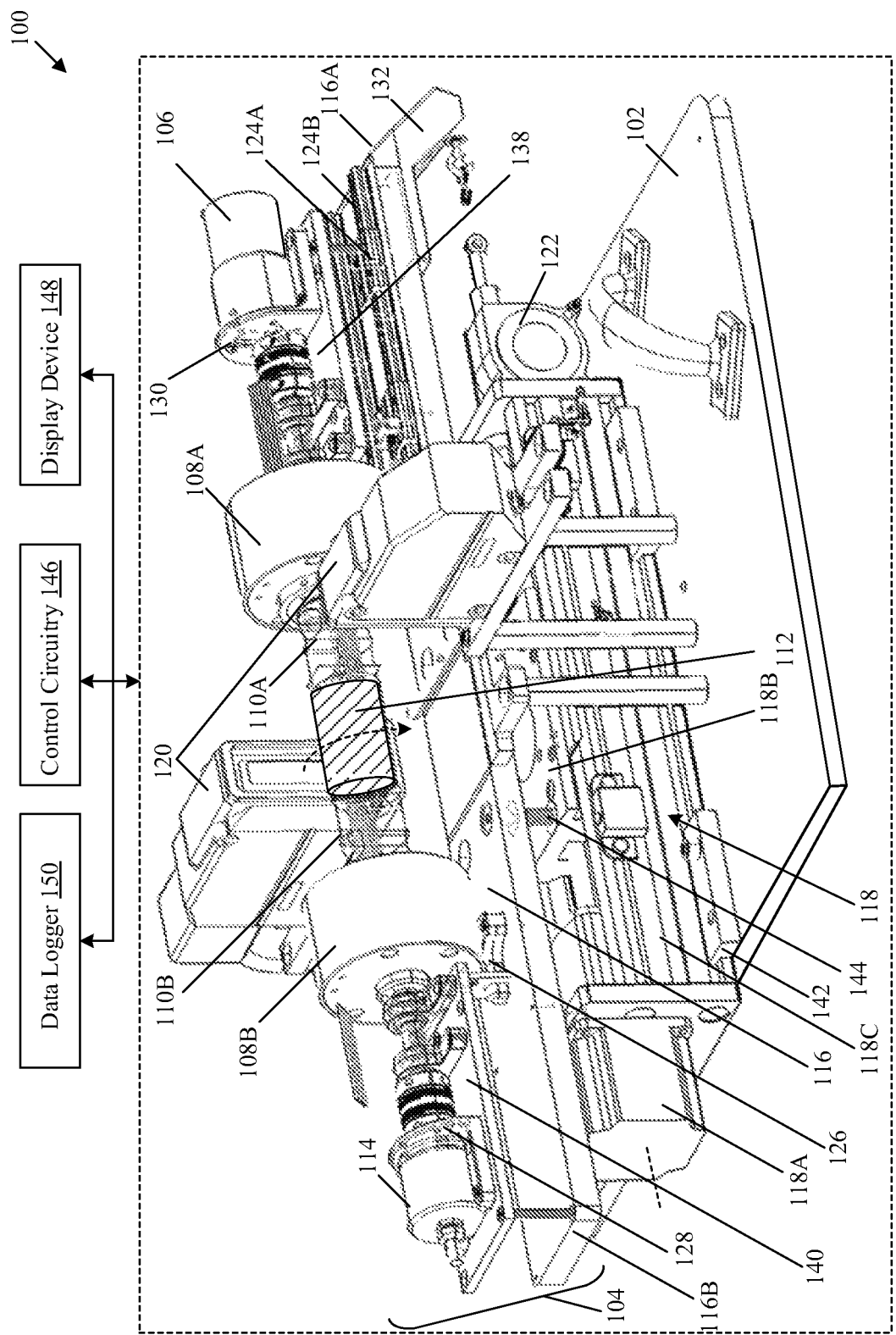
FIGS. 1A to 1P, collectively illustrate an apparatus and associated components of the apparatus, to detect deformation in a battery cell, in accordance with an embodiments of the disclosure.
Figure 1B:
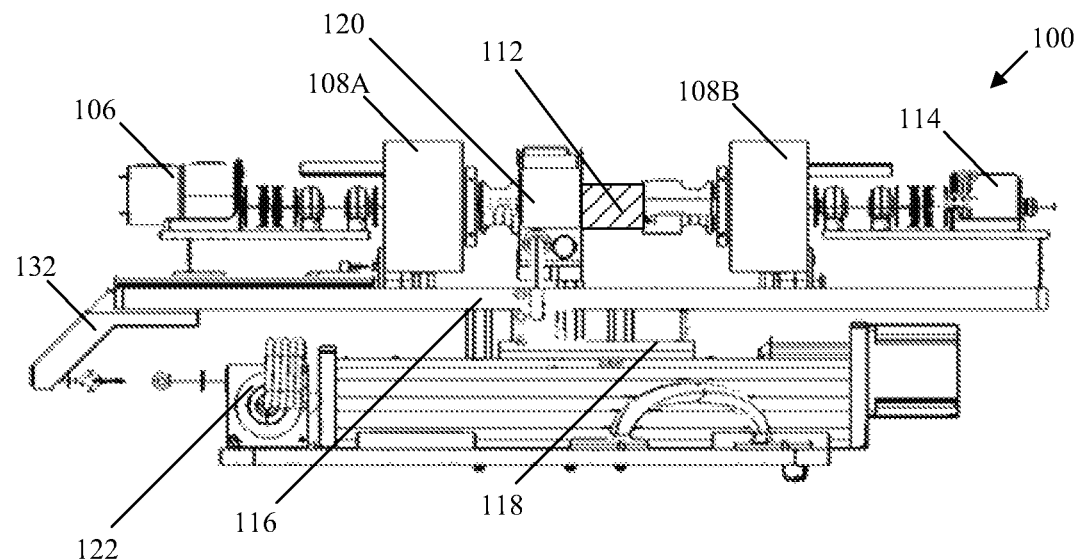
Figure 1C:
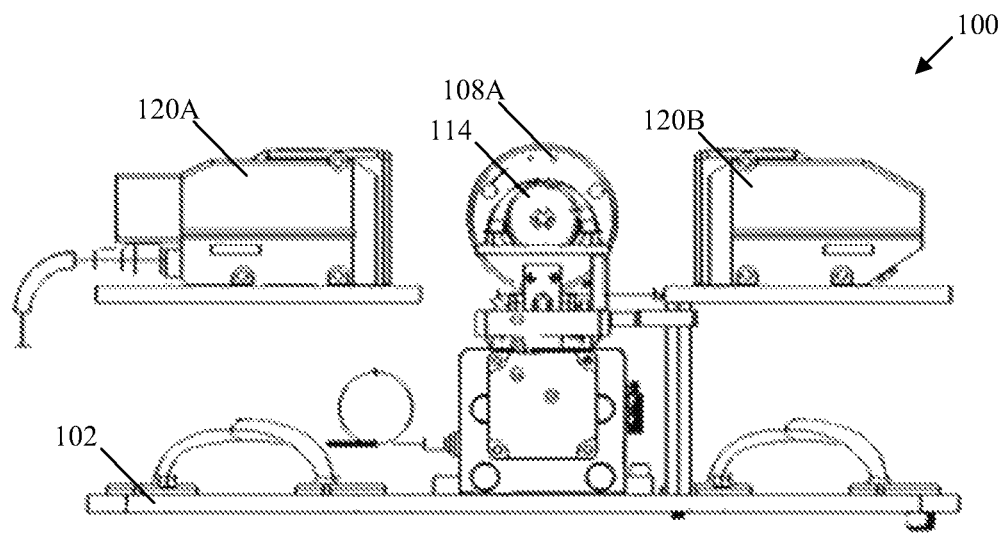
Figure 1D:
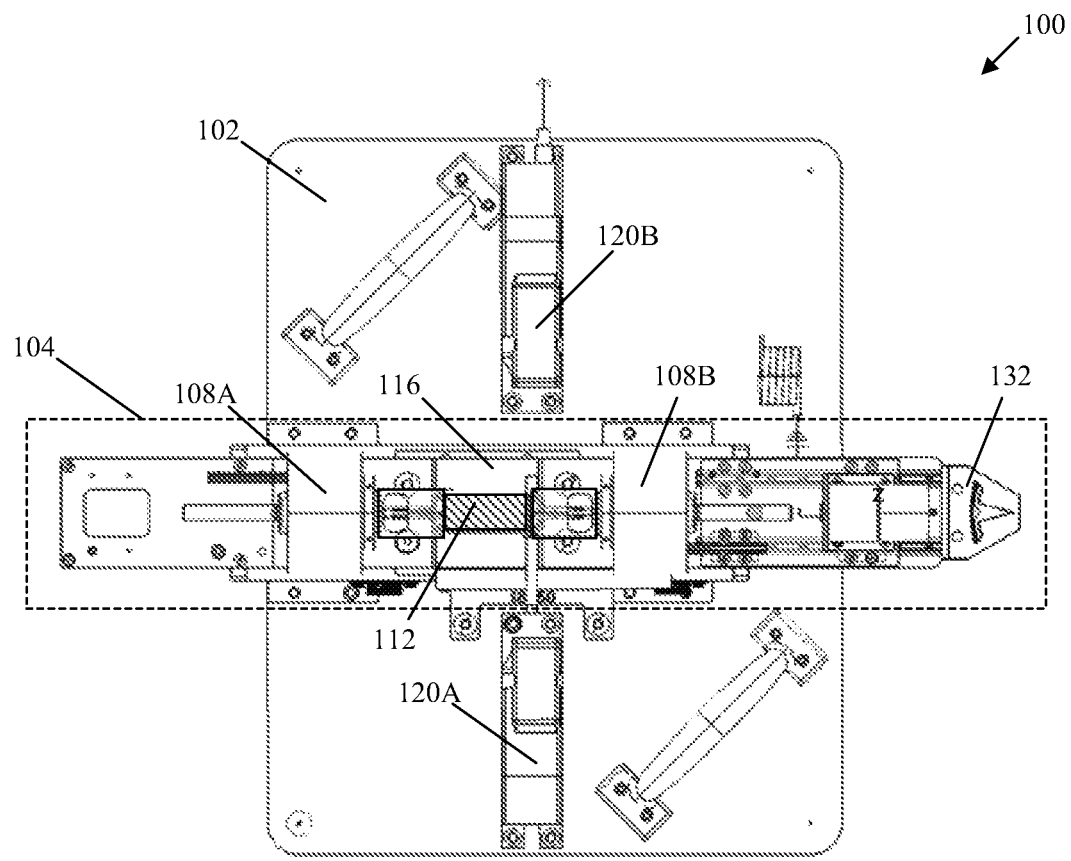
Figure 1E:
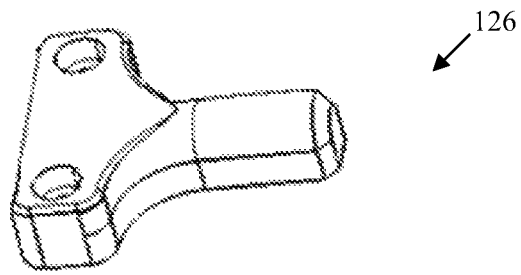
Figure 1F:
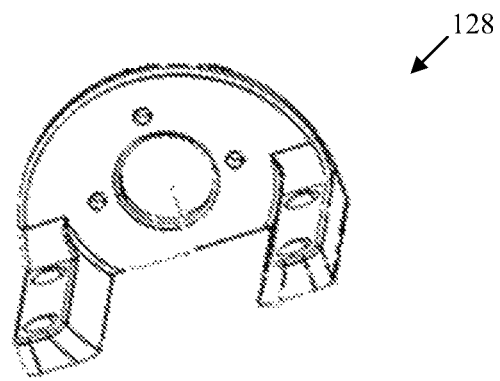
Figure 1G:
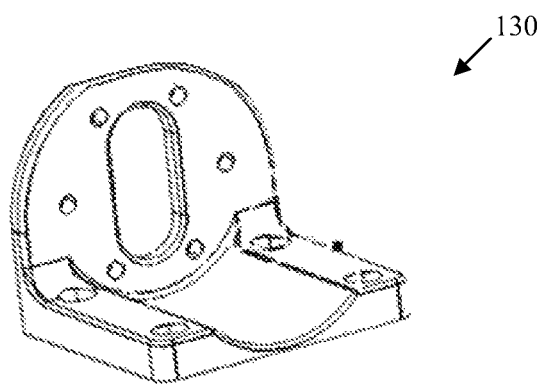
Figure 1H:
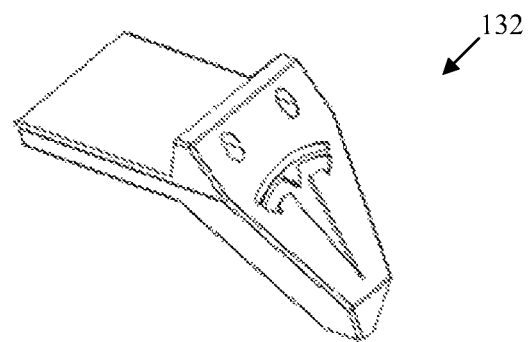
Figure 1I:
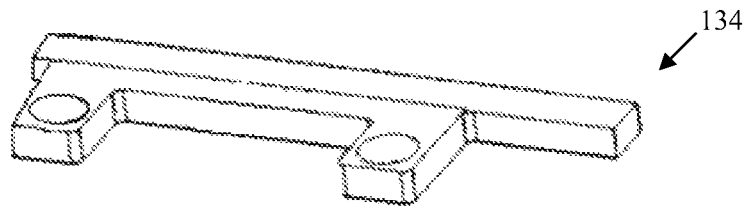
Figure 1J:
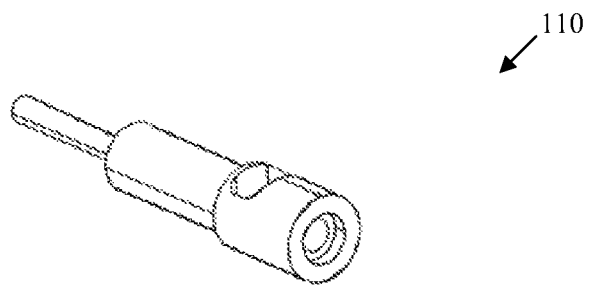
Figure 1K:
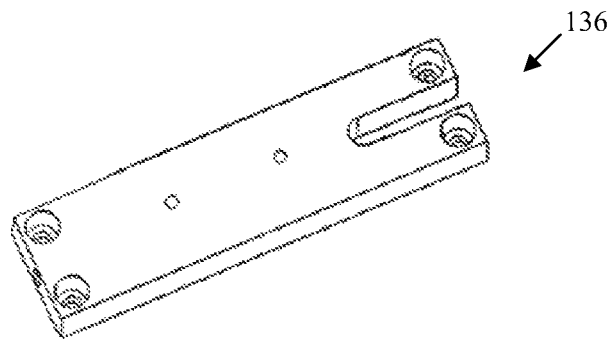
Figure 1L:
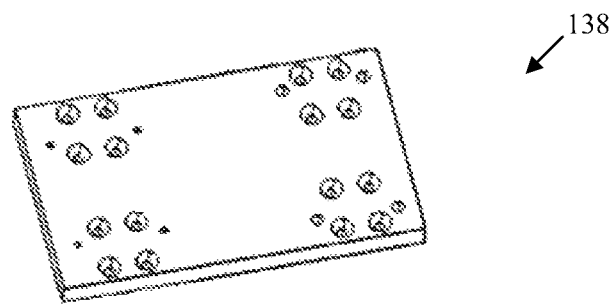
Figure 1M:
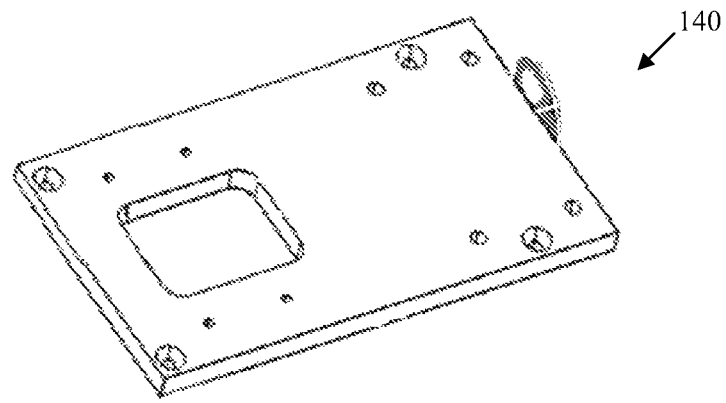
Figure 1N:
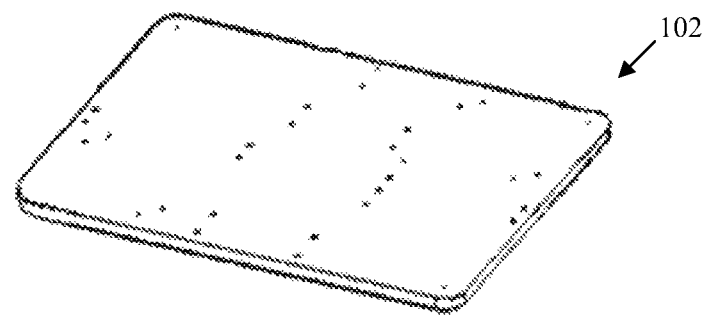
Figure 1O:
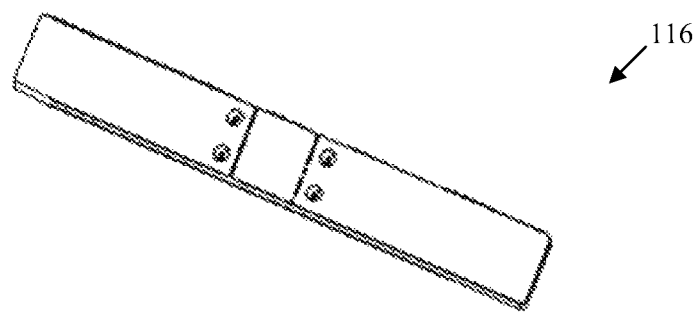
Figure 1P:
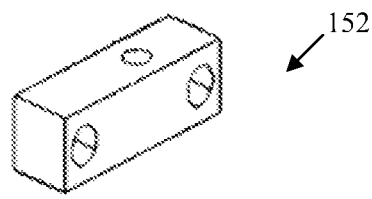

FIGS. 1A to 1P, collectively illustrate a deformation detection apparatus and associated components of the deformation detection apparatus, to detect deformation in battery cells, in accordance with an embodiments of the disclosure. With reference to FIG. 1A, there is shown a deformation detection apparatus, such as an apparatus 100. The apparatus 100 may include a base plate 102, a cell movement-control assembly 104, a battery cell 112, a first positional sensor 114, a digital micrometer 120, and a second positional sensor 122. In some embodiments, the digital micrometer 120 may be a digital optical micrometer that may be simply referred to as an optical micrometer. The cell movement-control assembly 104 may include a gear motor 106, a first slip ring 108A, a second slip ring 108B, a first shaft 110A, a second shaft 110B, a mounting plate 116, a linear positioning slide 118, a plurality of linear bearing carriages 124A, a plurality of guide rails 124B, a plurality of rotation stoppers 126, a plurality of sensor mounts 128, a motor mount 130, and an eyelet mounting bracket 132. The apparatus 100 may also include a set of cleats 142 affixed to the linear positioning slide 118 and the base plate 102, and one or more spacers 144 to support the mounting plate 116 on the linear positioning slide 118. Further, in FIG. 1A, the apparatus 100 may be communicatively coupled to a control circuitry 146, a display device 148, and a data logger 150.

he apparatus 100 may include a body that includes the base plate 102 that supports the cell movement-control assembly 104 and the digital optical micrometer 120. The cell movement-control assembly 104 may be configured to handle a linear motion and a rotational motion of the battery cell 112. The cell movement-control assembly 104 may include an arrangement of different components along a longitudinal axis, which may be parallel to a plane of the base plate 102. The different components of the cell movement-control assembly 104 are arranged along the longitudinal axis to hold the battery cell 112 and handle the linear motion and the rotational motion of the battery cell 112.

The cell movement-control assembly 104 may include the mounting plate 116, which may be supported by the one or more spacers 144 (or standoffs) attached to a carriage 118B of the linear positioning slide 118. The linear positioning slide 118 may be affixed to the base plate 102 via the set of cleats 142. The mounting plate 116 may support the gear motor 106 at one end (e.g. a first end 116A of the mounting plate 116) and the first positional sensor 114 at the other end (e.g. a second end 116B) of the mounting plate 116, as shown. In some embodiments, the gear motor 106 is mounted on the motor mounting plate 138 (shown in FIG. 1L). The motor mounting plate 138 may be further coupled to the plurality of linear bearing carriages 124A at the first end 116A of the mounting plate 116. The plurality of linear bearing carriages 124A may be spring-loaded on the plurality of guide rails 124B that may be supported by the mounting plate 116, through the plurality of carriage spring brackets 152 (shown in FIG. 1P) and springs that may be affixed to the mounting plate 116. The spring-loading of the carriage spring brackets 152 against the mounting plate 116 may facilitate loading and unloading of the battery cell 112. The gear motor 106 may be mounted on the motor mount 130 such that a shaft of the gear motor 106 may be aligned along the longitudinal axis of the cell movement-control assembly 104. In embodiments, the gear motor 106 is a direct current (DC) gear motor. In other embodiments, the gear motor 106 is a stepper motor, a servo motor, a digital servo motor, a switched reluctance motor, a torque motor, or another motor.

In accordance with an embodiment, the first positional sensor 114 is mounted on the encoder mounting plate 140 (also shown in FIG. 1M) that is attached to the sensor mount 128. The sensor mount 128 may be coupled to the mounting plate 116 at the second end 116B of the mounting plate 116. The first positional sensor 114 may be mounted on the sensor mount 128 such that a shaft of the first positional sensor 114 may be aligned along the longitudinal axis of the cell movement-control assembly 104.

In some embodiments, the first positional sensor 114 is a rotary magnetic encoder that may be used to determine angular displacement (e.g., theta values) of the battery cell 112. The second positional sensor 122 may be a string potentiometer that may be used to determine linear displacement of the battery cell 112. Other examples of the first positional sensor 114 and the second positional sensor 122 may include, but are not limited to a capacitive transducer, a capacitive displacement sensor, an ultrasonic sensor, a hall effect sensor, an inductive non-contact position sensor, a linear variable differential transformer (LVDT), an optical encoder, a multi-axis displacement sensor, a potentiometer-based sensor, or other rotational displacement/linear displacement sensors.

At the first end 116A of the mounting plate 116, the shaft of the gear motor 106 may be mechanically coupled to a first end of the first shaft 110A, which may be further aligned along the longitudinal axis of the cell movement-control assembly 104. A second end of the first shaft 110A may be mechanically coupled to a first terminal of the battery cell 112, and electrically coupled via electrical spring contacts attached within a bore present at the second end of the first shaft 110A. The bore along with the electrical spring contact in the first shaft 110A may be used as a first end of the cell holder. The first shaft 110A may be used to transfer torque generated by the gear motor 106 to the battery cell 112. The first shaft 110A may axially pass through the first slip ring 108A and may be mechanically coupled to the rotor of the first slip ring 108A. The electrical spring contacts in the first shaft 110A may be soldered or otherwise electrically connected to wires that may protrude from a rotor of the first slip ring 108A. The rotation stopper 126 (also shown in FIG. 1E) may be in contact with the first slip ring 108A to prevent a stator of the first slip ring 108A from rotating while the gear motor 106 may cause rotation of the battery cell 112 and the shafts 110A and 110B. Wires that protrude from the stator of the first slip ring 108A may be electrically connected to a specific battery testing device, such as the battery cycler. Thus, the first shaft 110A may be utilized to provide an electrical connection between the first terminal of the battery cell 112 and a specific battery testing device, such as the battery cycler. At the first end 116A, the first slip ring 108A may be positioned between the gear motor 106 and the first terminal of the battery cell 112.

At the second end 116B of the mounting plate 116, the shaft of the first positional sensor 114 may be mechanically coupled to a first end of the second shaft 110B, which is aligned along the longitudinal axis of the cell movement-control assembly 104. A second end of the second shaft 110B may be mechanically coupled to a second terminal of the battery cell 112, and electrically coupled via electrical spring contacts attached within a bore present at the second end of the second shaft 110B. The bore along with the electrical spring contact in the second shaft 110B may function as a second end of the cell holder. The second shaft 110B may be used to transfer the torque generated by the gear motor 106 to the first positional sensor 114. Further, the second shaft 110B may axially pass through the second slip ring 108B and may be mechanically coupled to the rotor of the second slip ring 108B. The electrical spring contacts in the second shaft 110B may be soldered or otherwise electrically connected to wires that may protrude from a rotor of the second slip ring 108B. The rotation stopper 126 (also shown in FIG. 1E) may be in contact with the second slip ring 108B to prevent a stator of the second slip ring 108B from rotating while the gear motor 106 may cause rotation of the battery cell 112 and the shafts 110A and 110B. Wires that may protrude from the stator of the second slip ring 108B may be electrically connected to a specific battery testing device, such as the battery cycler. Thus, the second shaft 110B may be utilized to provide an electrical connection between the second terminal of the battery cell 112 and a specific battery testing device, such as the battery cycler. At the second end 116B, the second slip ring 108B may be positioned between the first positional sensor 114 and the second terminal of the battery cell 112.

The second end of the first shaft 110A and the second end of the second shaft 110B may be separated by a distance in accordance to the specified surface of the battery cell 112. Either of the positive or the negative terminal of the battery cell 112 may be interchangeably positioned at either ends of the first shaft 110A and the second shaft 110B. The mounting plate 116 may be mechanically coupled to the carriage 118B of the linear positioning slide 118 positioned below the mounting plate 116 and supported by the base plate 102 of the apparatus 100. The linear positioning slide 118 may include a stepper motor 118A coupled to a lead screw or a drive shaft that may be enclosed in the linear positioning slide housing 118C. The stepper motor may be positioned parallel to the longitudinal axis of the cell movement-control assembly 104. The stepper motor 118A and coupled lead screw may be used to displace the mounting plate 116 and the components supported by the mounting plate 116, in linear motion along the longitudinal axis of the cell movement-control assembly 104. The displacement of the mounting plate 116 may be controlled using the motor controller based on control signals received from the control circuitry 146.

The linear displacement of the cell movement-control assembly 104 may be monitored by a second positional sensor 122 coupled to the base plate 102. Alternatively, a ruler (not shown) may be mounted on a ruler mount 134 (also shown in FIG. 1I) that may be supported by spacers or standoffs attached to the base plate 102, to facilitate measurement of the linear displacement of the battery cell 112. At the second end 116B, the mounting plate 116 may be further coupled with the eyelet mounting bracket 132, to provide mechanical connection between the second positional sensor 122 and the mounting plate 116.

The apparatus 100 may further include the digital micrometer 120, to scan and measure outer diameter value(s) of the battery cell 112, at a plurality of linear positions and a plurality of rotational positions of the battery cell 112. In accordance with an embodiment, the digital micrometer 120 includes a receiver component 120A and an emitter component 120B. Each of the receiver component 120A and the emitter component 120B may be configured to collectively scan a specific region of the battery cell 112 at a specific time. The receiver component 120A and the emitter component 120B of the digital micrometer 120 may be positioned on opposite sides of the mounting plate 116 and supported by a plurality of micrometer mounting plates 136 (also shown in FIG. 1K). The micrometer mounting plate 136 may be further attached to the base plate 102 through the one or more spacers 144 (or standoffs). In some embodiments, the digital micrometer 120 is an optical micrometer. In other embodiments, it may be a digital drop gauge, digital dial indicator, electronic test indicator, a linear variable differential transformer (LVDT), a linear variable inductive transformer (LVIT), a laser profilometer, a laser displacement sensor, or other displacement-measuring device.

In certain embodiments, instead of a single digital micrometer, a plurality of digital micrometers that include a plurality of emitter components is placed adjacent to each other and a plurality of receiver components may be placed adjacent to each other. Each of the plurality of emitter components and the plurality of receiver components may be positioned symmetrically opposite to each other and may be aligned along an axis orthogonal to the longitudinal axis of the cell movement-control assembly 104. In certain embodiments, the receiver component 120A may include a plurality of active receiver circuits arranged adjacent to each other and the emitter component 120B may include a plurality of active emitter circuits arranged adjacent to each other. For such configuration, the plurality of active emitter circuits in the emitter component 120B and the plurality of active receiver circuits in the receiver component 120A may collectively form a modified digital micrometer. Such modified arrangement of the digital micrometer 120 may facilitate faster measurement of outer diameter values of the battery cell 112 across the entire surface of the battery cell 112.

The apparatus 100 may further include a temperature measurement component (not shown), such as a thermocouple, to measure temperature values ambient to surroundings of the battery cell 112. In certain embodiments, the temperature measurement component is attached to the base plate 102 of the apparatus 100, through at least one of adhesives, screws, clips, and the like. In other embodiments, the temperature measurement component may be an infrared sensor capable of directly measuring the surface temperature of the battery cell 112, or other temperature measuring device coupled to the battery cell and/or used to measure ambient temperature.

In accordance with an embodiment, the apparatus 100 may further include the control circuitry 146, which may be communicatively coupled with the cell movement-control assembly 104, the first positional sensor 114, the second positional sensor 122, the motor controller (not shown), the battery cycler (not shown), the digital micrometer 120 and the display device 148. The control circuitry 146 may be configured to control the operations of different components specified above. The data logger 150 may be further communicatively coupled to the control circuitry 146 and different operational components of the apparatus 100. The data logger 150 may log data associated with the measured temperature values, the outer diameter values, the strain values, state of charge (SOC) of the battery cell 112, cell voltage, cell current, linear displacement values, axial displacement values, and the like. Additionally, the display device 148 may be utilized to visualize or statistically 1Dentify different parameters that affect an optimal operation of the battery cell 112.

In accordance with an embodiment, the first terminal and the second terminal of the battery cell 112 is coupled to a specific battery testing device, such as a battery cycler, through the first slip ring 108A and the second slip ring 108B, respectively. Although not shown, the battery cycler may be free-standing, or may be affixed to either the base plate 102 or the mounting plate 116 of the cell movement-control assembly 104. The battery cycler may be further configured to record different electrical parameters for the battery cell 112 at different charging rates (C-rates) and at different SOCs.

In operation, the battery cell 112 may be placed between the cell holder, collectively formed by the second end of the first shaft 110A and the second end of the second shaft 110B. The battery cell 112 may be placed such that an axis of the battery cell 112 is aligned to the longitudinal axis of the cell movement-control assembly 104. In accordance with an embodiment, the battery cell 112 is a rechargeable battery cell having a cylindrical geometry. In certain embodiments, a plurality of rechargeable battery cells is enclosed in a conductive enclosure to form a single battery having a cylindrical geometry. In other embodiments, the battery cell 112 is a non-rechargeable battery cell having a cylindrical geometry. In other embodiments, the battery cell 112 is a rechargeable or a non-rechargeable battery/battery cell having a shape different from the cylindrical geometry.

It is to be understood by a person one of ordinary skill in the art that the apparatus 100 may be used to detect and measure a plurality of outer diameter values and a plurality of strain values of the battery cell 112 that may be of different sizes or chemical composition, without limiting the scope of the disclosure. The size of a battery cell is usually associated with a length, an initial outer diameter of the battery cell 112, a rated cell capacity, a rate charging current, a rate charging voltage, a rated range of thermal resistance/stability values, specific energy density values, and other parameters. Examples of the battery cell 112 based on battery size classification may include, but are not limited to CR123A, CR2, 2CR5, CR-P2, CR-V3, 4/SAA, ½ AA, A, AA, AAA, AAAA, B, C, Sub-C, D, F, N, A23, A27, BA5800, Duplex, and 4SR44, 18650, and 2170. Other examples of the battery cell 112 based on chemical composition classification may include, but are not limited to a flooded lead-acid battery, a deep-cycle lead-acid battery, and a valve-regulated lead-acid battery (VRLA), a NiCad battery, a nickel-metal hydride battery, a lithium-ion battery, a Li-ion polymer battery, a zinc-air battery, and a molten-salt battery.

The control circuitry 146 of the apparatus 100 may be configured to control different operations associated with the determination of deformation(s) in the battery cell 112 when exposed to different charging/discharging rates, states of charge (SOCs), ambient temperature values, and the like. In accordance with an embodiment, the control circuitry 146 retrieves a specification of the battery cell 112, such as a length, an initial outer diameter value, a weight, a rated supply current, a rated capacity, a rated voltage, a rated operational temperature value, and other parameters. The control circuitry 146 may utilize the specification to adjust a speed of rotation and a speed of linear displacement of the battery cell 112. The retrieved specification may be further utilized by the control circuitry 146, to determine a first position and a second position, between which the battery cell 112 may be displaced back and forth. Such positions may be determined to cover an entire surface of the battery cell 112 present between the cell holders. In accordance with another embodiment, in absence of stored specification of the battery cell 112, the control circuitry 146 measures different parameters of the battery cell 112 by use of different sensors and/or devices associated with the battery cell 112 in real time or near-real time.

The cell movement-control assembly 104 may be configured to handle a linear motion and a rotational motion of the battery cell 112, along the longitudinal axis. The cell movement-control assembly 104 may be configured to displace the battery cell 112 back and forth from the first position to the second position along the longitudinal axis of the battery cell 112. The displacement of the battery cell 112 back and forth may be done by use of the linear positioning slide 118 that is coupled to the mounting plate 116. The linear positioning slide 118 further drives the mounting plate 116 and associated mounted components including the battery cell 112 back and forth, by use of the stepper motor coupled to the linear positioning slide 118. Alternatively stated, the displacement of the battery cell 112 may be done by the stepper motor 118A of the linear positioning slide 118 while the digital micrometer 120 is affixed and kept stationary with respect to the base plate 102. During the defined number of movement cycles, the control circuitry 146 may control the cell movement-control assembly 104, to facilitate displacement of the battery cell 112 back and forth from the first position to the second position along the longitudinal axis of the battery cell 112. The battery cell 112 may be displaced through a scanning region of the digital micrometer 120, at a plurality of charge states and a plurality of discharge states of the battery cell 112.

As the battery cell 112 may be linearly displaced along the longitudinal axis, the gear motor 106 may be controlled by the control circuitry 146, to further displace the battery cell 112 about the longitudinal axis such that a plurality of rotational positions may be further captured within the scanning region of the digital micrometer 120. At the same time, the first positional sensor 114, such as a magnetic rotary encoder, may determine a plurality of rotational positions of the battery cell 112, based on an angular displacement of the battery cell 112 from an initial angular position of the battery cell 112. The angular displacement and the rate of angular displacement may be controlled by the control circuitry 146, in conjunction with the gear motor 106. The second positional sensor 122 may determine a plurality of linear positions of the battery cell 112, based on a linear displacement of the battery cell 112 from an initial position of the battery cell 112. The linear displacement and the rate of linear displacement may be controlled by the control circuitry 146, in conjunction with the stepper motor and stepper controller.

The control circuitry 146, using the battery cycler, may be configured to control a plurality of charge states and a plurality of discharge states of the battery cell 112. The plurality of charge states and the plurality of discharge may be controlled during the linear displacement of the battery cell 112 from the first position to the second position along the longitudinal axis of the battery cell 112 for the defined number of movement cycles. Additionally, heating of the battery cell 112 may be controlled by the control circuitry 146, by controlling charging rates, charging current, ambient temperature, loads, and the like. During test phase, the battery cell 112 may be subjected to operate under different operations constraints, which may be based on charging current, discharging current, charging voltage, internal temperature, external ambient temperature, and variable loads.

At each charge and discharge state, the digital micrometer 120 may be configured to determine a plurality of outer diameter values for the battery cell 112 at the plurality of linear positions and the plurality of rotational positions of the battery cell 112. The plurality of outer diameter values may be measured based on the displacement of the battery cell 112 through the scanning region of the digital micrometer 120 in the linear motion and the rotational motion along the longitudinal axis of the battery cell 112. The control circuitry 146 may be configured to receive, from the digital micrometer 120, the plurality of outer diameter values of the battery cell 112 for the plurality of linear positions and the plurality of rotational positions along the longitudinal axis of the battery cell 112, at the plurality of charge states and the plurality of discharge states of the battery cell 112.

For example, for a 3.7 Volts, 5.570 milliamp-hour (mAH) rechargeable cylindrical lithium-ion battery cell that has an initial outer diameter of "21 millimeters" and a length of "70 millimeters", the plurality of outer diameter values at the plurality of linear positions (in mm) and the plurality of rotational positions (in radians or degrees) may be measured by the digital micrometer 120 and outputted to the control circuitry 146. The digital micrometer 120 may be configured to execute a 4D scan of the battery cell 112 such that the plurality of outer diameter values approximately cover an entire 3D geometry of the battery cell 112 undergoing deformations at one or more points as a function of time.

The control circuitry 146 may be further configured to monitor a change in a geometrical shape of the battery cell 112, for the plurality of linear positions and the plurality of rotational positions along the longitudinal axis of the battery cell 112. The change in the geometrical shape may be further monitored at each of the plurality of charge states and the plurality of discharge states of the battery cell 112. The change in the geometrical shape may be monitored based on the received plurality of outer diameter values of the battery cell 112. In accordance with an embodiment, at each charge state/discharge state of the battery cell 112, the control circuitry 146 is configured to determine a plurality of strain values for the battery cell 112, at the plurality of linear positions and the plurality of rotational positions along the longitudinal axis of the battery cell 112. Such plurality of strain values may be determined based on the received plurality of outer diameter values and the initial outer diameter value for the battery cell 112.

The control circuitry 146 may be further configured to detect a deformation of the battery cell 112 based on a monitored change in the geometrical shape of the battery cell 112. In embodiments, the deformation of the battery cell 112 is detected based on a comparison of the determined plurality of strain values with a specified tolerance strain value for the battery cell 112. In other embodiments, the deformation is detected when some of the outer diameter values in a specific region of the battery cell 112 vary distinctly from the specified initial outer diameter value of the battery cell 112. In accordance with an embodiment, the control circuitry 146 is further configured to generate an alert signal based on abnormal deformation(s) of the battery cell 112. Such abnormal deformations may be detected when at least one of the determined plurality of strain values exceed the tolerance strain value for the battery cell 112. Although not mentioned, the deformation of the battery cell 112 may also correspond to a localized/non-localized swelling of cell casings, electrodes, or electrochemically active materials present within the battery cell 112.

The data logger 150 associated with the apparatus 100 may be configured to log or store data associated with the measured temperature values, the outer diameter values, the strain values, state of charge (SOC) of the battery cell 112, cell voltage, cell current, linear displacement values, rotational position values, and the like, in a suitable storage media, such as a database. The logged data may capture different parameters at the plurality of linear positions, the plurality of rotational positions, and at the plurality of charge and discharge states of the battery cell 112. The control circuitry 146 may be configured to generate a 3D graphic model of the battery cell 112 based on logged or stored data received in real time or near-real time from the data logger 150. In embodiments, the control circuitry 146 communicates the logged data to the display device 148, which may then generate the 3D graphic model of the battery cell 112 for visualization. The 3D graphic model of the battery cell 112 may be a time variant model of the battery cell 112 that represents the 3D surface geometry of the battery cell 112. A time-variant deformation of the battery cell 112 (or cell casing of the battery cell 112), at each of the plurality of charge states and the plurality of discharge states of the battery cell 112, may be visualized in the generated 3D graphic model of the battery cell 112, presented at the display device 148. As the 3D graphic model of the battery cell 112 is a time variant model (e.g., a fourth dimension), the visualization rendered on the display device 148 may be referred to as a four dimensional (4D) digital model to visualize the deformations (or swelling) across the entire surface of the battery cell 112 for the plurality of linear positions and the plurality of rotational positions at each charge/discharge state of the battery cell 112.

The disclosed apparatus, such as the apparatus 100 and method of determination of deformations in the battery cell 112 advantageously provides a contactless solution for deformation detection in the battery cells, as compared to conventional contact-based solutions. Further, instead of measuring the plurality of outer diameter values/strain values at a specific point in time, the disclosed apparatus 100 advantageously facilitates measurement of the plurality of outer diameter values/strain values at a plurality of points on the battery cell 112. The apparatus 100 enables detection of localized/non-localized deformation regions on the battery cell 112, which may exhibit signs of deformation at different charge/discharge states at different points in time.

In a first implementation, the apparatus 100 may be placed in a thermal chamber to simulate ambient thermal conditions for battery cells, which may be installed in a specific device that usually operates under such thermal conditions. The thermal chamber may also facilitate the analysis of localized/non-localized swelling/deformation of the battery cell 112 due to thermal expansion of the battery cell 112. Each component of the apparatus 100 may be adapted to optimally operate in such simulated operational conditions.

In a second implementation, the apparatus 100 may be utilized as a coordinate measuring machine (CMM) for specific objects, which may be different from a battery cell 112, for example, conduits, pipes, and casings. In a third implementation, the apparatus 100 may be configured to determine outer diameter values/strain values/deformations for objects that have shapes different from the cylindrical shape of the battery cell 112. In a fourth implementation, the apparatus may be adapted to contain multiple cell holders, each of which can hold a single cylindrical battery cell such that the multiple cell holders may be arranged in tandem along the longitudinal axis, to test multiple battery cells at the same time. It may be noted that the apparatus 100 may include more functional and non-functional components, to optimally perform strain test on the battery cell for deformations, without a deviation from scope of the disclosure. The description of such components have been omitted for the sake of brevity.

With reference to FIGS. 1B to 1D, there are shown different views of the apparatus 100 of FIG. 1A With reference to FIG. 1B, there is shown a side view of the apparatus 100 of FIG. 1A With reference to FIG. 1C, there is shown a front view of the apparatus 100 of FIG. 1A With reference to FIG. 1D, there is shown a top view of the apparatus 100 of FIG. 1A The operations and components shown in the FIGS. 1B to 1D are same as that of the FIG. 1A, but shown in different views.

With reference to FIGS. 1E to 1P, there are shown perspective views of different components of the apparatus 100 of FIG. 1A to 1D. With reference to FIG. 1E, there is shown the rotation stopper 126 (also shown in FIG. 1A) that may be used to prevent the stators of the slip rings 108 from rotating while the gear motor 106 may cause rotation of the battery cell 112 and the shafts 110A and 110B. With reference to FIG. 1F, there is shown the sensor mount 128 (also shown in FIG. 1A) that is used to support the first positional sensor 114 such that a shaft of the first positional sensor 114 is aligned along the longitudinal axis of the cell movement-control assembly 104. With reference to FIG. 1G, there is shown the motor mount 130 (also shown in FIG. 1A) that is used to support the gear motor 106 such that a shaft of the gear motor 106 is aligned along the longitudinal axis of the cell movement-control assembly 104. With reference to FIG. 1H, there is shown the eyelet mounting bracket 132 that is used to provide mechanical connection between the second positional sensor 122 and the mounting plate 116. With reference to FIG. 1I, there is shown the ruler mount 134 that is used to mount the ruler and facilitate the measurement of linear displacement of the mounting plate 116. With reference to FIG. 1J, there is shown the shaft 110 (for example, the first shaft 110A or the second shaft 110B) that may be used to drive the battery cell 112 in a rotational motion along the longitudinal axis of the apparatus 100, and to facilitate electrical connection of the battery cell 112 with the battery cycler. With reference to FIG. 1K, there is shown the micrometer mounting plate 136 that may be installed separately for each of the receiver component 120A and the emitter component 120B, to provide support and precise alignment to the digital micrometer 120. In other words, there may be different mounting plates for the receiver component 120A and the emitter component 120B. With reference to FIG. 1L, there is shown the motor mounting plate 138 that is used to provide a support to the gear motor 106 and the motor mount 130. With reference to FIG. 1M, there is shown the encoder mounting plate 140 that is used to support the first positional sensor 114 (for example, a rotary encoder) on the mounting plate 116. With reference to FIG. 1N, there is shown the base plate 102 that is used to provide support to different operational/non-operational component of the apparatus 100, based on support fixtures, for examples, with spacers, standoffs, and screws. With reference to FIG. 1O, there is shown the mounting plate 116 that is used to facilitate the cell movement-control assembly 104, to displace the battery cell 112 linearly along the longitudinal axis. With reference to FIG. 1P, there is shown a carriage spring bracket 152 that may be used to spring-load the plurality of linear bearing carriages 124A and facilitate the loading and unloading of a battery cell 112. Although not shown, the apparatus 100 may further include a thermocouple, a battery cycler, and a motor controller.

Figure 2:
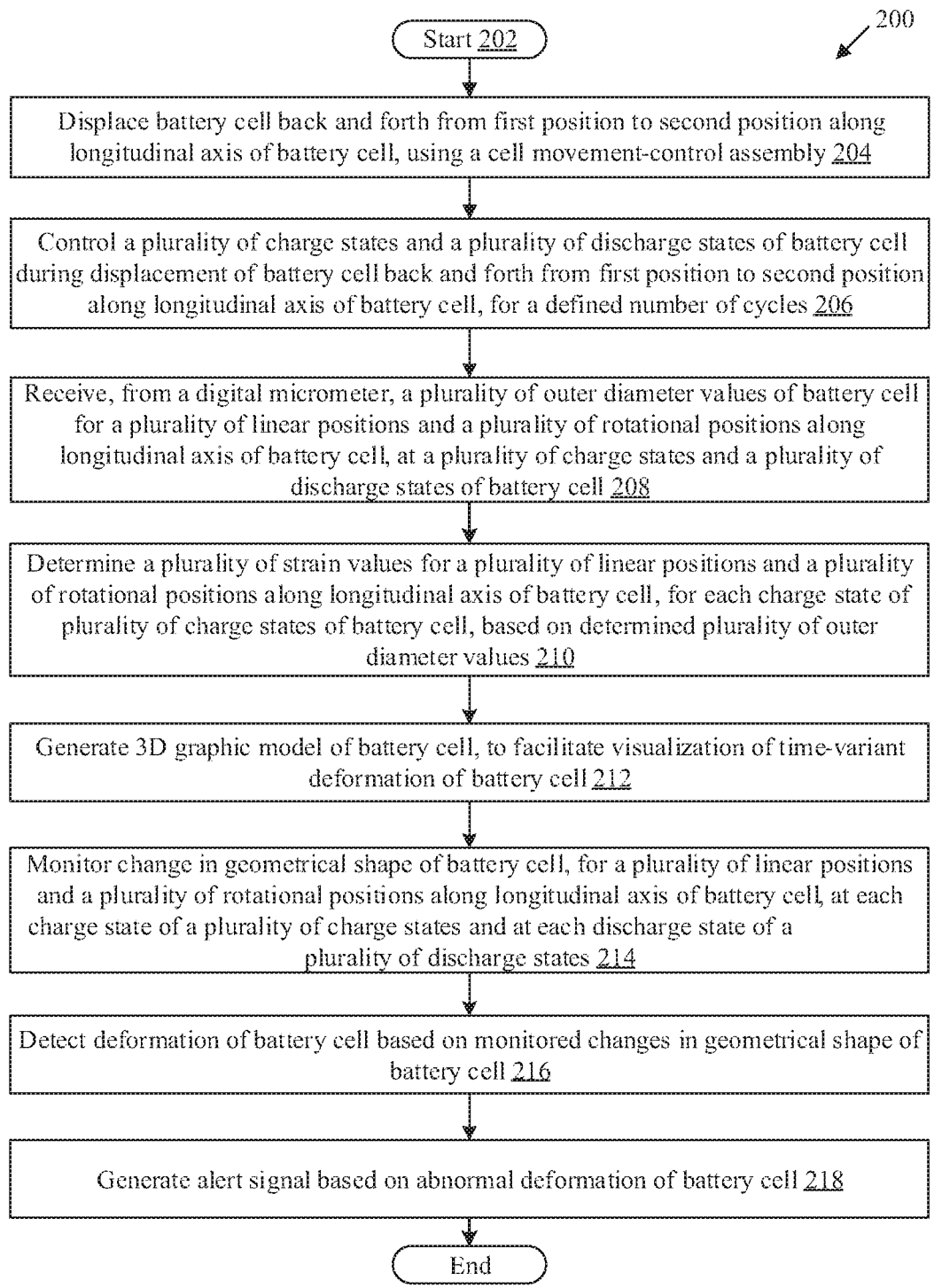
FIG. 2 is a flowchart that illustrates a method for detection of deformation in a battery cell, in accordance with an embodiment of the present disclosure.

FIG. 2 is a flowchart that illustrates a method to detect deformation in a battery cell, in accordance with an embodiment of the present disclosure. FIG. 2 is explained in conjunction with FIGS. 1A to 1P. With reference to FIG. 2, there is shown a flowchart 200. The exemplary operations of the flowchart 200, implemented in the apparatus 100, begins at 202 and proceeds to 204.

At 204, the battery cell 112 is displaced back and forth from a first position to a second position along a longitudinal axis of the battery cell 112, using the cell movement-control assembly 104. Using the cell movement-control assembly 104, the control circuitry 146 may be configured to displace the battery cell 112 back and forth from the first position to the second position, along the longitudinal axis of the battery cell 112.

At 206, a plurality of charge states and a plurality of discharge states of the battery cell 112 is controlled during the displacement of the battery cell 112 back and forth from the first position to the second position the longitudinal axis of the battery cell 112, for a defined number of movement cycles. The control circuitry 146, using the battery cycler, may be configured to control the plurality of charge states and the plurality of discharge states of the battery cell 112 during the displacement of the battery cell 112 back and forth from the first position to the second position along the longitudinal axis of the battery cell 112.

At 208, a plurality of outer diameter values for the battery cell 112 are received from the digital micrometer 120, for the plurality of linear positions and at the plurality of rotational positions of the battery cell 112 along the longitudinal axis of the battery cell 112. The control circuitry 146 may be configured to receive the plurality of outer diameter values for the battery cell 112 from the digital micrometer 120, at the plurality of linear positions and at the plurality of rotational positions of the battery cell 112 along the longitudinal axis of the battery cell 112.

At 210, a plurality of strain values are determined for the plurality of linear positions and the plurality of rotational positions of the battery cell 112 along the longitudinal axis of the battery cell 112, for each charge state and discharge state of the plurality of charge states and discharge states of the battery cell 112, based on the determined plurality of outer diameter values. The control circuitry 146 may be configured to determine the plurality of strain values for the plurality of linear positions and the plurality of rotational positions of the battery cell 112, for each charge state and discharge state of the plurality of charge states and discharge states of the battery cell 112, based on the determined plurality of outer diameter values.

At 212, a 3D graphic model of the battery cell 112 is generated to facilitate visualization of time-variant deformation of the battery cell 112. The control circuitry 146 may be configured to generate the 3D graphic model of the battery cell 112 to facilitate visualization of the time-variant deformation of the battery cell 112 on the display device 148.

At 214, changes in the geometrical shape of the battery cell 112 are monitored, for the plurality of linear positions and the plurality of rotational positions of the battery cell 112, at each charge state and at each discharge state of the plurality of charge states and the plurality discharge states of the battery cell 112. The control circuitry 146 may be configured to monitor the changes in the geometrical shape of the battery cell 112 for the plurality of linear positions and the plurality of rotational positions of the battery cell 112, at each charge state and at each discharge state of the plurality of charge states and the plurality discharge states of the battery cell 112.

At 216, deformation(s) (e.g., swelling) in the battery cell 112 is/are detected based on monitored changes in the geometrical shape of the battery cell 112. The control circuitry 146 may be configured to detect a deformation in the battery cell 112 based on a monitored change in the geometrical shape of the battery cell 112.

At 218, an alert signal is generated based on the detected deformation(s), for example, an abnormal deformation, of the battery cell 112. The control circuitry 146 may be configured to generate the alert signal based on the abnormal deformation of the battery cell 112. Control passes to end.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process. It will also be appreciated that one or more of the elements depicted in the drawings/figures can also be implemented in a more separated or integrated manner, or even removed or rendered as inoperable in certain cases, as is useful in accordance with a particular application.

What is claimed is:

1. Control circuitry configured for inclusion in a deformation detection apparatus for a battery cell, the control circuitry being communicatively configured to control movement of the battery cell, wherein the control circuitry is configured to:
   control a displacement of the battery cell along an axis of the battery cell for a particular number of movement cycles;
   receive a plurality of outer diameter values of the battery cell for a plurality of linear positions and a plurality of rotational positions along the axis of the battery cell, the outer diameter values being based on the displacement of the battery cell; and
   determine, based on the outer diameter values, a plurality of strain values for the plurality of linear positions and the plurality of rotational positions along the longitudinal axis of the battery cell for one or more charge states.

2. The control circuitry of claim 1, wherein displacement is based on a particular scanning region associated with a digital micrometer included in the deformation detection apparatus.

3. The control circuitry of claim 1, wherein the outer diameter values are received via the digital micrometer.

4. The control circuitry of claim 1, wherein the strain values are determined based on the received outer diameter values and an initial outer diameter value for the battery cell.

5. The control circuitry of claim 1, wherein displacement is for a plurality of charge states and wherein the plurality of strain values are determined for the plurality of charge states.

6. The control circuitry of claim 1, wherein the control circuitry is further configured to monitor a change in a geometrical shape of the battery cell for the one or more charge states based on the outer diameter values.

7. The control circuitry of claim 6, wherein the control circuitry is configured to generate an alert in response to detection of a deformation based on the monitored changes.

8. The control circuitry of claim 1, wherein the axis is a longitudinal axis of the battery cell.

9. Control circuitry configured for inclusion a deformation detection apparatus for a battery cell, the control circuitry being communicatively configured to control movement of the battery cell, wherein the control circuitry is configured to:
   control a displacement of the battery cell along an axis of the battery cell for a particular number of movement cycles;
   receive a plurality of outer diameter values of the battery cell for a plurality of linear positions and a plurality of rotational positions along the axis of the battery cell, the outer diameter values being based on the displacement of the battery cell; and
   determine, based on the outer diameter values, a change in a geometrical shape of the battery cell for the plurality of linear positions and the plurality of rotational positions along the longitudinal axis of the battery cell for one or more charge states.

10. The control circuitry of claim 9, wherein the control circuitry is further configured to detect a deformation of the battery cell based on a monitored change in a geometrical shape of the battery cell.

11. The control circuitry of claim 9, wherein the control circuitry is further configured to generate a three-dimensional model of the battery cell.

12. The control circuitry of claim 11, wherein the three-dimensional model is configured to facilitate visualization of time-variant deformation of the battery cell.

13. The control circuitry of claim 9, wherein the axis is a longitudinal axis of the battery cell.

14. The control circuitry of claim 9, wherein displacement is based on a particular scanning region associated with a digital micrometer, and wherein the outer diameter values are received via the digital micrometer.

15. A method of detecting deformation of a battery cell, the method being implemented by control circuitry of a deformation detection apparatus and comprising:
   displacing the battery cell along an axis of the battery cell for a particular number of movement cycles;
   receiving a plurality of outer diameter values of the battery cell for a plurality of linear positions and a plurality of rotational positions along the axis of the battery cell, the outer diameter values being based on the displacement of the battery cell, and the outer diameter values being measured via a digital micrometer; and determining, based on the outer diameter values, a change in a geometrical shape of the battery cell for the plurality of linear positions and the plurality of rotational positions along the longitudinal axis of the battery cell for one or more charge states.

16. The method of claim 15, further comprising detecting a deformation of the battery cell based on the determined change in a geometrical shape of the battery cell.

17. The method of claim 15, further comprising generating a three-dimensional model of the battery cell.

18. The method of claim 15, further comprising causing presentation, via a display, of the three-dimensional model which depicts the battery cell at different points in time.

* * * * *